United States Patent

Kuehl et al.

[15] 3,690,439
[45] Sept. 12, 1972

[54] ACCUMULATING CONVEYOR

[72] Inventors: Guenther L. Kuehl, Peekskill; Axel Coelln, Wappinger Falls, both of N.Y.

[73] Assignees: Guenther Systems, Inc., Buchanan; Z-Loda Corporation, New York, N.Y.

[22] Filed: May 17, 1971

[21] Appl. No.: 143,887

[52] U.S. Cl. .................198/110, 198/129, 198/189
[51] Int. Cl. .........................B65g 17/40, B65g 21/12
[58] Field of Search......................198/110, 129, 189

[56] References Cited

UNITED STATES PATENTS 2,990,941  7/1961  Peras........................198/170

Primary Examiner—Edward A. Sroka
Attorney—Brumbaugh, Graves, Donohue & Raymond

[57] ABSTRACT

As disclosed herein, an accumulating conveyor comprises at least two spaced roller chains that travel in a prescribed endless loop below a storage surface. Aligned trigger cam members are selectively mounted on the chains. The cam members are displaceable between load supporting positions whereat the cam members support the unit loads of material and enable the loads to be transported by the chains between spaced locations and non-load supporting positions whereat the cam members travel beneath the unit loads of material without contacting the loads.

9 Claims, 7 Drawing Figures

PATENTED SEP 12 1972　　　　　　　　　　　　3,690,439

INVENTORS.
GUENTHER L. KUEHL &
AXEL COELLN
BY Brumbaugh, Graves, Donohue + Raymond their ATTORNEYS INVENTORS.
GUENTHER L. KUEHL &
AXEL COELLN
BY
Brumbaugh, Graves, Donohue + Raymond their ATTORNEYS

ACCUMULATING CONVEYOR

BACKGROUND OF THE INVENTION

This invention relates to conveyor systems and, more particularly, to a new and improved accumulating conveyor for enabling the accumulation of unit loads of material when driven in one direction and for enabling the continuous discharge of unit loads of material when driven in the opposite direction.

Presently devised conveyor systems for accumulating unit loads of material, such as containers and the like, at a predetermined location include endless friction belts, idler rollers which are located above the friction belts for transporting the unit loads of material, and snubber or friction adjustment rollers mounted beneath the belt. Loads of material are carried by the idler rollers until the forward motion thereof is interrupted by a stopping mechanism or by already accumulated unit loads of material. Because the friction belts continue to rotate, the idler rollers associated therewith bear against the immovable unit loads of material, with either or both the following deleterious results: (1) unit loads of material are damaged by the continuous (1) between the rollers and the containers or (2) the rollers bear against the friction belts causing wear and related fatigue problems.

In addition to the foregoing, presently devised accumulating conveyors are expensive to purchase, install and maintain. Constant adjustments must be made to the snubber rollers and a constant watch must be maintained to make certain that neither the accumulated materials nor the friction rollers have been damaged during prolonged operation.

SUMMARY OF THE INVENTION

Accordingly, it is an object of the present invention to provide an accumulating conveyor which overcomes the above-mentioned disadvantages of the prior art.

It is a further object of the present invention to provide an accumulating conveyor in which the supporting surface of the conveyor is removed from engagement with the unit loads of material when the forward motion of the material is interrupted.

These and other objects are accomplished by the accumulating conveyor of the present invention which accumulates unit loads of material on a storage surface. According to the invention, the conveyor comprises at least one pair of spaced endless support members that travel in a prescribed flow path within which the storage surface is located. Displaceable load supporting members are mounted on the spaced endless support members and include load supporting positions for engaging and carrying unit loads of material above the storage surface and disengagement positions out of contact with the unit loads of material when the motion of the material is interrupted.

In a preferred embodiment of the invention, aligned trigger cam members are mounted on the chains forming the at least one chain pair. In one position, the trigger cam members extend above the storage surface to support the unit loads of material until the forward motion of the material is interrupted. When the motion of the material is interrupted, the cam members rotate to a position which allows the unit loads of material to be deposited on the storage surface.

DESCRIPTION OF THE PREFERRED EMBODIMENT

In the illustrative embodiment of an accumulating conveyor arranged according to the present invention, as shown in FIGS. 1–7, two pairs of horizontally disposed drive sprockets 10 and 12 define a loop for an endless chain pair 14. Because of the view, only one chain of the endless chain pair 14 is shown in FIGS. 1–6 and, for the sake of simplicity, the conveyor is shown as including only one chain pair. The present invention is applicable to multiple chain pair systems which would be provided to suit the material handling specifications for any installation. Generally, the number of chain pairs will be governed by the weight of the unit loads of material to be handled. Reference may be made to the U.S. Pat. No. 3,578,145, assigned to the assignee of the present application, for a comprehensive disclosure of multiple chain pair transport systems.

Figure 7:
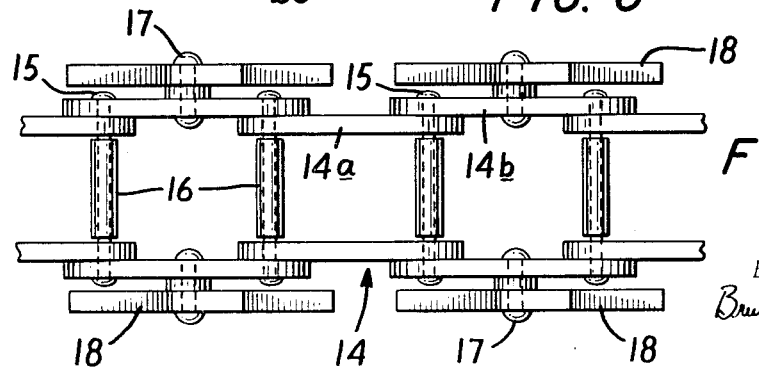
FIG. 7 is a plan view of a conventional roller chain fitted with a load supporting cam member arranged according to the present invention.

As shown in FIG. 7, each chain of the chain pair 14 may be a standard roller chain and, accordingly, includes inner and outer links 14a and 14b that are coupled together by pin members 15. A roller member 16 is mounted on each of the pin members 15. As will be understood, the spacing between the roller members accommodates the teeth of a sprocket, e.g. sprockets 10 and 12, which bear against the roller members to drive or guide the roller chain in a prescribed flow path.

Centrally mounted in the walls of the outer links 14b of the chain 14 are fixed pins 17 which receive and serve as pivot points for a corresponding number of toggle cam members 18 having trigger or toggle legs 18a. It will be understood that neither the method for mounting the cam members nor the location of the cam members is critical. For example, the cam members 18 could also be mounted on the pin members 15 coupling the inner and outer links 14a and 14b together, instead of at the centers of the outer links 14b. In addition, the cam members 18 need not be mounted on successive outer links, but could also be mounted at any spacing which is necessary for a desired application. It will be noted, however, that the minimum cam spacing equals twice the pitch of the roller chain 14. As will be described in detail hereinbelow, the cam members 18 pivot between load supporting positions where the forward edge surfaces 18b (See FIGS. 1–6) thereof extend above a storage surface 20 and disengagement positions where the forward edge surfaces 18b thereof are maintained below the storage surface 20.

Referring again to FIGS. 1–6, the storage surface 20 is shown extending above the chain pair 14 and situated between the chains forming the chain pair 14. In a typical conveyor installation, the surface 20 will extend the full length of the conveyor. When tripped to their load supporting positions, the cam members carry unit loads of material 22 above the storage surface 20. An erected stop 24 is provided in the conveyor to interrupt the forward motion of the unit loads 22 which will then be deposited onto the storage surface 20 by the cam members 18. A guide bar 25 spanning the width of the chain pair 14 is located adjacent the sprockets 12 and is provided to insure that the cam members are retained in their load supporting positions after leaving the sprockets 12. A pair of guide bars 26 (or a single conveyor spanning bar) are mounted beneath the chains forming the chain pair 14 and maintain the cam members in the return flow path in a position where they will trip the cam members in the drive flow path during the unloading operation. This will become more apparent when the unloading operation illustrated in FIGS. 4–6 is described.

Figure 1:
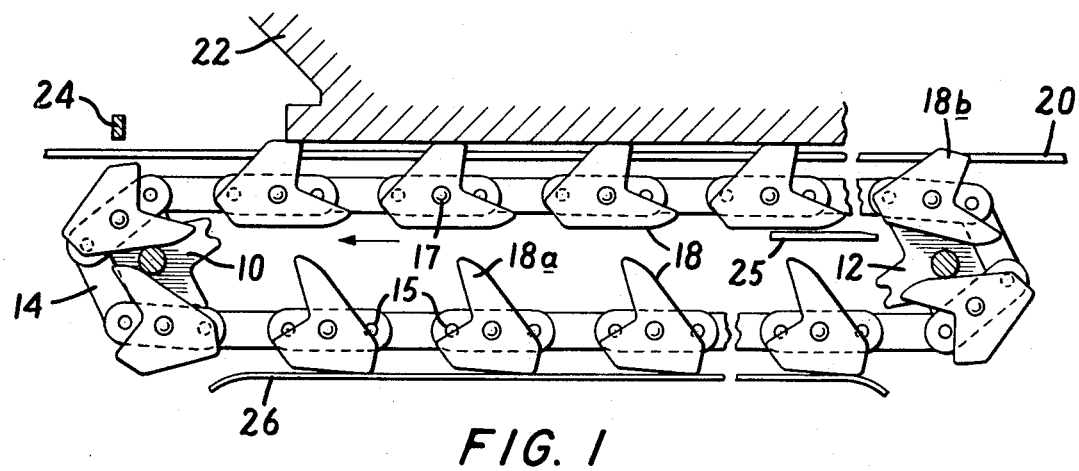
FIGS. 1–3 illustrate the sequence of operations carried out by an exemplary accumulating conveyor arranged according to the present invention during a loading operation.
Figure 2:
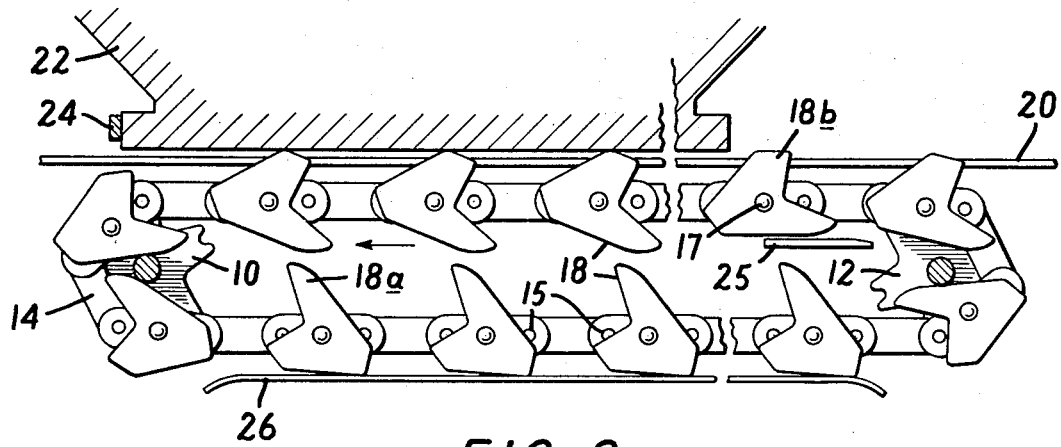
Figure 3:
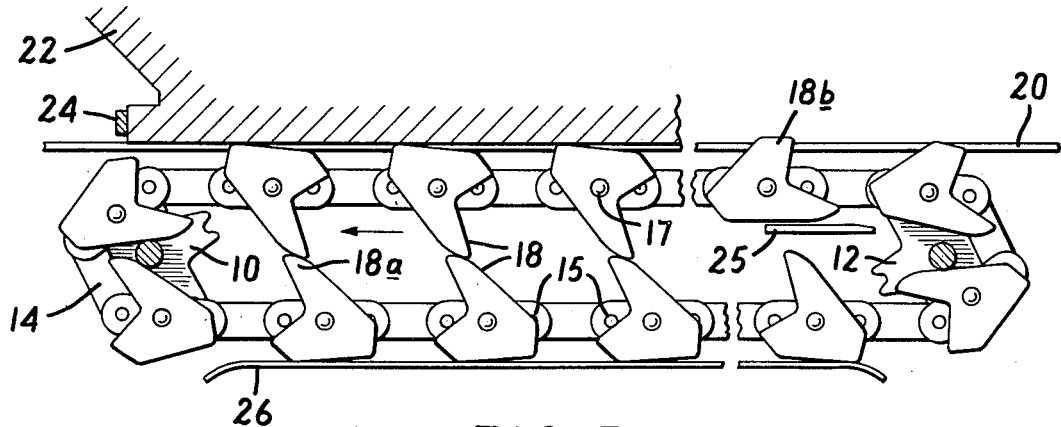

Referring to FIGS. 1–3 which illustrate the operational sequence of the conveyor of the present invention during the accumulation of unit loads of material 22 on the surface 20, the chain pair 14 travels in a counterclockwise direction about the sprockets 10 and 12. In the return flow path, the cam members 18 are maintained in disengagement positions by the guide bars 26, but as the chains travel around the sprocket 12, the trigger legs 18a of the cam members 18 are engaged by the drive shafts for the sprockets 12 and rotated into load supporting positions with the forward edge surfaces 18b extending above the storage surface 20. The frictional engagement between the unit loads of material 22 as they are slided onto the forward edge surfaces aids the counterclockwise force exerted against the cam members 18 by the sprocket drive shafts. The guide bars 26 insure that the forward edge surfaces 18b of the cams 18 are maintained upright to receive the unit loads of material 22. Once the cam members 18 pass beyond the guide bars 26, the load 22 will keep the cams 18 in position since the forward edge 18b of the cams are in front of the vertical center lines of the pivot pins 17 for the cams 18.

As shown in FIG. 2, when the forward motion of the unit loads of material 22 is interrupted by the stop 24, the friction created between the unit loads of material 22 and the cam members 18 causes the cams 18 to rotate in a clockwise direction. This action will raise the load 22 for a fraction of an inch since the forward edge of the carrying surface 18b creates a larger radius, but once the high point is reached, the load 22 will be deposited onto the storage surface 20 and out of contact with the cams 18. As shown in FIG. 3, when the unit load of material 22 rests on the storage surface 20, the cams 18 move in a horizontal plane that coincides substantially with the plane of the storage surface and hence, the cams 18 will not contact the unit loads of material 22. In the absence of a unit load of material 22, as the cam members 18 leave the guide 25 adjacent the sprockets 12, gravity will cause the cam members 18 to rotate in a clockwise direction until their load supporting upper surfaces 18b are below the storage surface 20.

Figure 4:
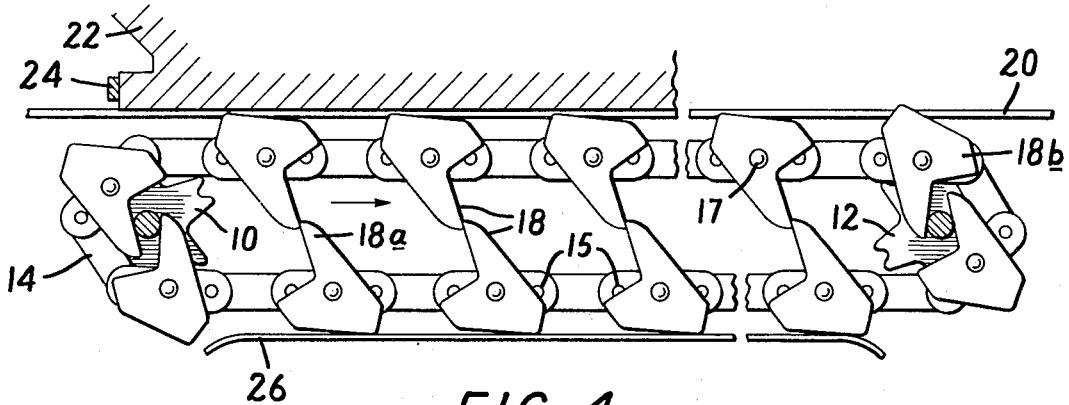
FIGS. 4–6 illustrate the sequence of operations carried out by an illustrative accumulating conveyor arranged according to the present invention during an unloading operation.
Figure 5:
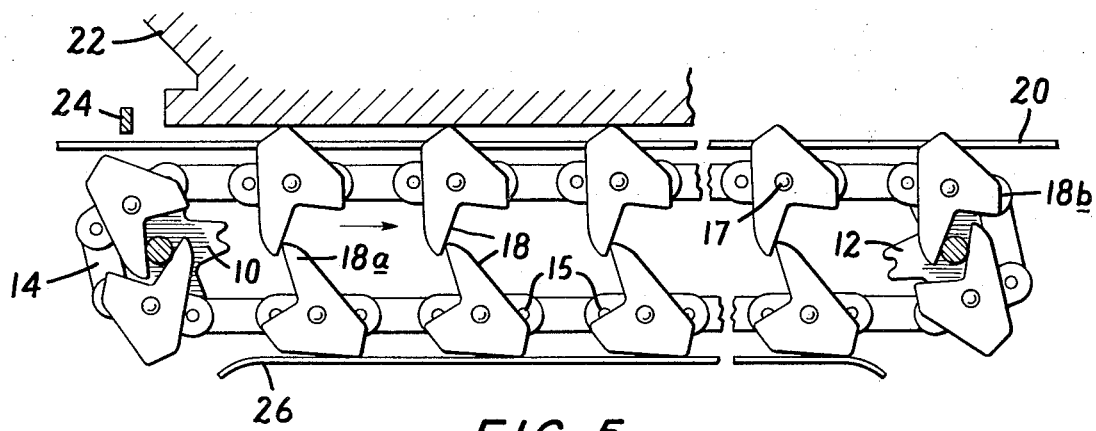
Figure 6:
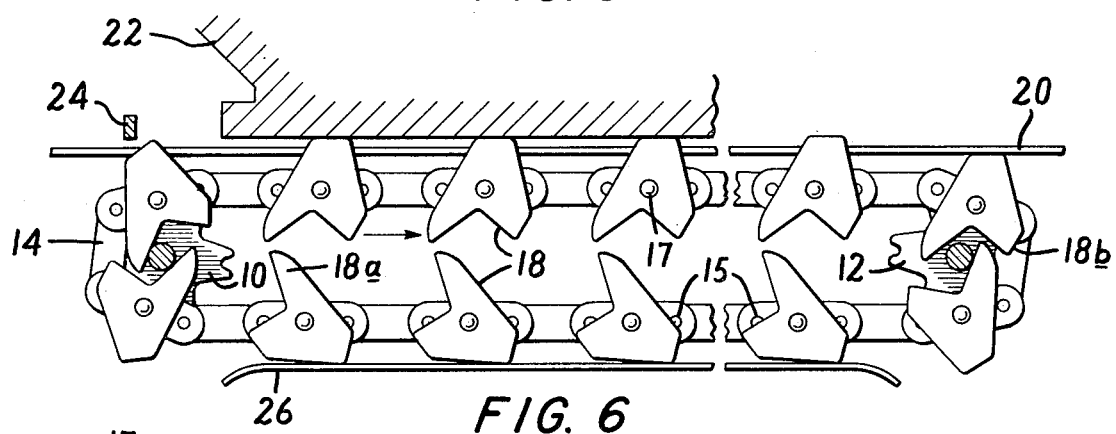

Referring now to FIGS. 4–6, there is shown a sequence of operations carried out by the conveyor of the present invention for continuously discharging unit loads of material 22 that had been accumulated on the storage surface 20. In this operation, the sprockets 10 and 12 are driven in a clockwise direction to thereby drive the chain pair 14 in a clockwise direction. Upon actuation of movement by the chain pair 14, the trigger pins 18a of the cam members in the return flow path, which are maintained in fixed position by the guide bar 26, engage the corresponding trigger pins 18a of upper cams in the support or upper flow path to drive the upper cam members 18 into load supporting positions. This engagement continues until the front edge surfaces 18b of the cams are flush with the unit loads of material 22. The upper cam members 18 in the upper flow path raise the unit loads of material 22 from the storage surface 20 and move the unit loads of material 22 on the chain until the unit loads of material 22 are discharged from the conveyor at the right side thereof, as viewed in FIGS. 4–6.

As an alternative to triggering the upper cams by means of the trigger fingers 18a of the lower cams, fixed pins may be mounted in the conveyor frame for driving the cam members 18 in a clockwise direction and the load supporting surfaces 18b of the cam members to a position where the cam members raise the unit loads of material from the storage area. In this alternate embodiment, the guide bars 26 can be omitted.

The conveyor of the present invention may be installed on trucks and aircraft to accumulate loads or containers of material in a tight formation. When the truck or aircraft reaches its intended destination, the entire load can be unloaded easily. The present invention, therefore, may be provided to eliminate lift tables, transfer cars or intersections in any conveyor or sorting system. By erecting a stop at the transfer station, the load can be dropped on a lateral conveyor rather than a fixed surface.

Although the invention has been described herein with reference to a specific embodiment, many modifications and variations therein will readily be apparent to those skilled in the art. Accordingly, all such variations and modifications are included within the intended scope of the invention as defined by the following claims.

We claim:

1. In a reversible conveyor system for transferring unit loads of material to and from a first surface, the improvement comprising at least one pair of spaced movable endless support members adapted to be driven in a prescribed flow path within which the first surface is located, and displaceable load supporting members mounted on the spaced support members, said members being displaceable between load supporting positions whereat the members are adapted to support the unit loads of material above the storage surface and non-load supporting positions whereat the members are located below the unit loads of material.

2. A conveyor system according to claim 1 wherein the first surface is disposed between the endless support members and wherein each of the dispalceable load supporting members comprises a cam member rotatable between a load supporting position whereat one surface thereof extends above the first surface and a disengagement position whereat none of the surfaces thereof extends above the first surface.

3. A conveyor system according to claim 2 wherein the second surface is disposed between the support members and extends over the entire length of the prescribed flow path for the movable endless support members.

4. A conveyor system according to claim 2 wherein each cam member comprises a trigger portion and further comprising trigger means for engaging sequentially the trigger portion of each of said cam member for driving each cam member into a load supporting position.

5. A conveyor system according to claim 4 wherein the natural position for each of the cam members on the support members is the disengagement position and further comprising guide means situated adjacent the triggering means for maintaining each of the cam members in its load supporting position over a short distance in the prescribed flow path.

6. A conveyor system according to claim 5 wherein the cam member surface extending above the first surface is displaceable about a pivot point in a controlled arc and wherein the weight of the unit loads of material supported by the cam members maintains the cam members in their load supporting positions.

7. A conveyor system according to claim 6 further comprising drive means for driving the spaced movable endless support members from a first position adjacent the triggering means to the first surface and further comprising means for interrupting the motion by the unit loads of material above the second surface to drive the cam members into their disengagement positions and thereby deposit the unit loads of material onto the second surface.

8. A conveyor system according to claim 6 further comprising drive means for driving the spaced endless support members in a direction away from the first surface to a discharge point and further comprising means for rotating the cam members situated beneath the unit loads of material into their load supporting positions to thereby lift the unit loads of material away from the first surface and transport the unit loads of material to the discharge point.

9. A conveyor system according to claim 8 wherein the flow path comprises a drive flow path extending between the first surface and the discharge point and a return flow path extending between the discharge point and the first surface, the cam rotating means comprises the trigger portions of the cam members located in the return flow path for the spaced members and further comprising guide means for maintaining the cam members in a position to trigger the cam members in the drive flow path into their load supporting positions.

* * * * *